B. G. PATTERSON.
RIDDLE FOR ROOT EXTRACTORS.
APPLICATION FILED JUNE 27, 1908.

934,345.

Patented Sept. 14, 1909.

3 SHEETS—SHEET 1.

WITNESSES
L. H. Schmidt
C. E. Trainor

INVENTOR
BENJAMIN G. PATTERSON,
BY
ATTORNEYS

B. G. PATTERSON.
RIDDLE FOR ROOT EXTRACTORS.
APPLICATION FILED JUNE 27, 1908.

934,345.

Patented Sept. 14, 1909.
3 SHEETS—SHEET 3.

WITNESSES
J. H. Schmidt.
C. E. Trainor

INVENTOR
BENJAMIN G. PATTERSON,
BY Munn & Co.
ATTORNEYS

UNITED STATES PATENT OFFICE.

BENJAMIN GILBERT PATTERSON, OF ADDINGTON, OKLAHOMA.

RIDDLE FOR ROOT-EXTRACTORS.

934,345.

Specification of Letters Patent. Patented Sept. 14, 1909.

Application filed June 27, 1908. Serial No. 440,622.

*To all whom it may concern:*

Be it known that I, BENJAMIN GILBERT PATTERSON, a citizen of the United States, and a resident of Addington, in the county of Jefferson and State of Oklahoma, have invented certain new and useful Improvements in Riddles for Root-Extractors, of which the following is a specification.

My invention is an improvement in riddles for root extractors, and consists in certain novel constructions and combinations of parts, hereinafter described and claimed.

Figure 1:
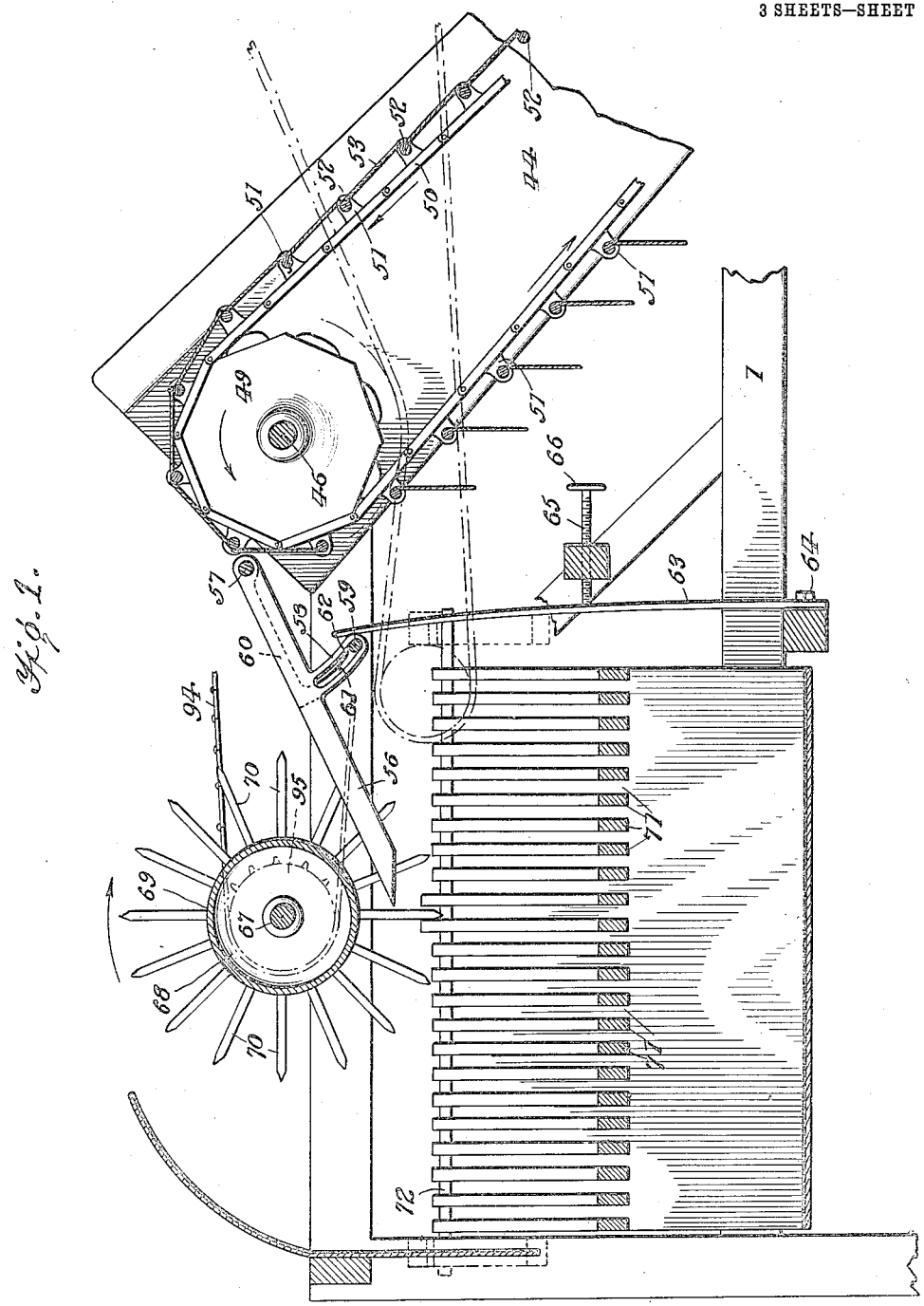
Figure 2:
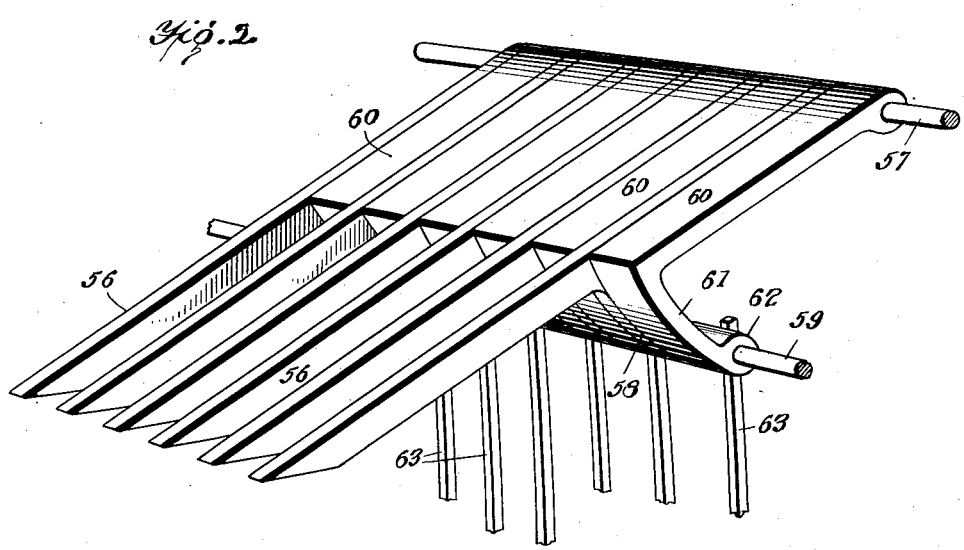
Figure 3:
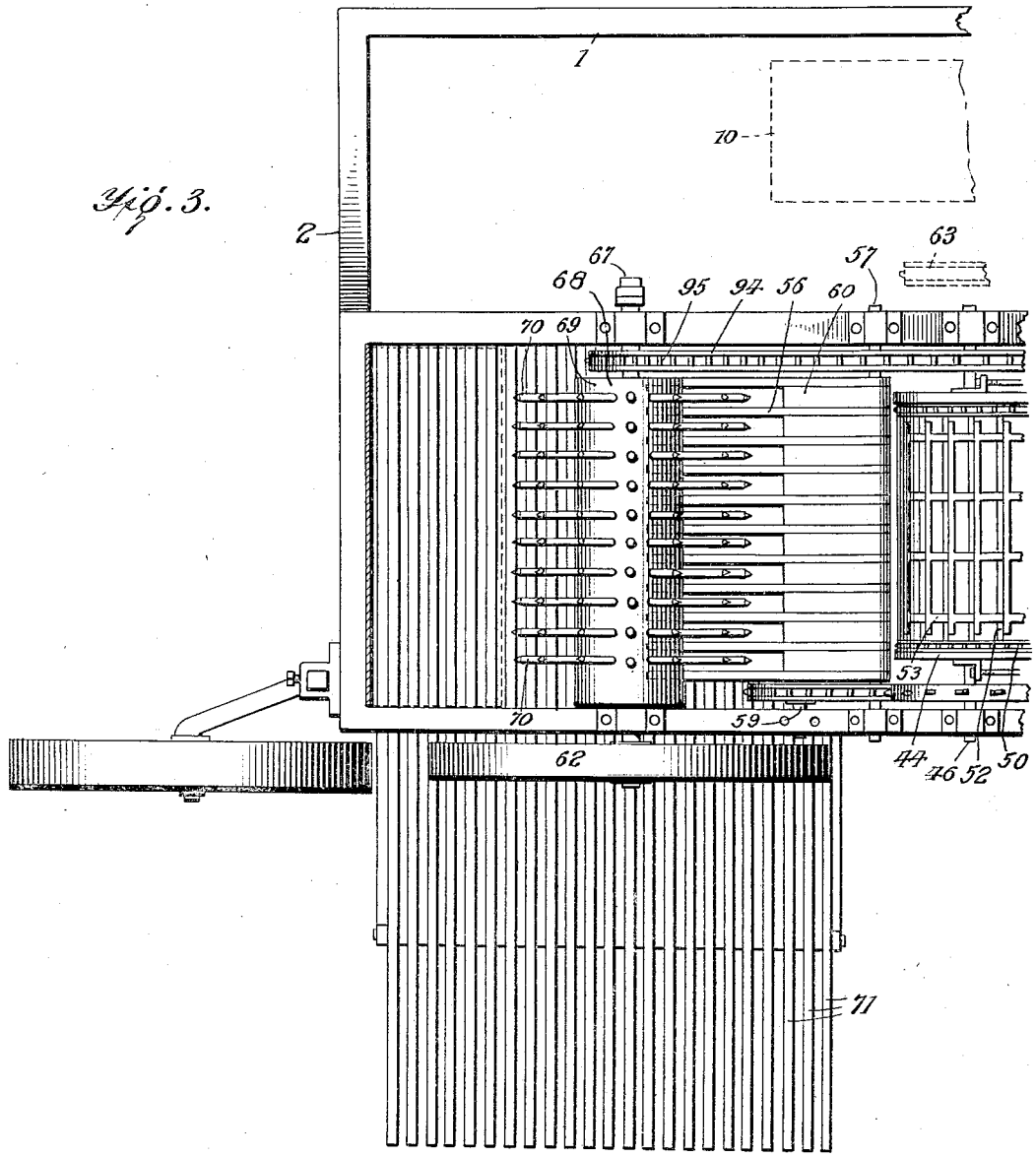

Referring to the drawings forming a part hereof, Figure 1 is a longitudinal section of a portion of the machine provided with the improvement. Fig. 2 is a detail perspective view of the riddle, and Fig. 3 is an enlarged plan view of a portion of the machine.

The present embodiment of the invention is especially adapted for use in machine for extraction of Johnson grass, which as is well known propagates by means of seed roots, which make a very rapid growth forming a mat in the soil so that it becomes impossible to cultivate any crop therein.

The object of the invention is to extract the roots from the soil, and to deliver them in a form suitable for feeding or for fertilizer as may be desired.

The present embodiment of the invention comprises a frame 1 consisting of side members connected by cross bars 2.

An elevator delivers the roots, which may be dug by any suitable mechanism to the riddle, the elevator consisting of spaced plates 44, connected by shafts 46, one of which is shown. The shafts are provided at each end inside of the plates with sprocket wheels 49, over which pass sprocket chains 50, each link of the said chains being provided with a lug 51, which is connected with the corresponding lug on the other chain by a rod 52, and a plate 53 is secured to each of the rods, overlapping on the upper run of the carrier, but hanging vertically on the lower run.

The elevator or carrier delivers the dirt and the roots on to a riddle, which consists of a plurality of bars 56, pivoted on a rod 57 arranged transversely of the frame, each being provided with an arc-shaped slotted lug 58, and through all of the slots a rod 59 is passed, the said rod extending transversely of the frame. Between each of the bars 56 is arranged a shorter bar 60, pivoted to the rod 57 and provided with a lug 61, having a bearing 62 through which passes the rod 59 before mentioned. A spring bears against each of the lugs 58, the said springs each comprising a bar 63, connected to the frame as at 64, the free end of the bar engaging the lug, and each of the bars is engaged at approximately its center by the end of a screw threaded rod 65, provided with a hand wheel 66 for convenience in manipulating the same. A shaft 67 is journaled on the auxiliary frame above and to the rear of the riddle, and spaced disks 68 are secured on the shaft the disks being connected by a drum 69, provided with longitudinal series of spaced teeth 70. The teeth 70 are arranged between the bars 56 and coöperate therewith in breaking up the dirt and separating the roots therefrom. The drum 69 is driven by a sprocket chain 94 connecting a sprocket wheel 95 on the shaft 67 of the drum, with a moving part of the machine. The bars 56 deliver on to a second riddle, which consists of a plurality of spaced parallel bars 71, having their one end connected with a rod 72.

I claim—

1. In a root extractor, a riddle comprising pivotally mounted bars, the alternate bars being of greater length than the intermediate bars and movable with respect thereto, springs against which the said bars rest, means for adjusting the tension of the springs, a cylinder rotatably mounted above the riddle and provided with fingers arranged to pass between the longer bars.

2. In a root extractor, a riddle comprising a shaft, fingers journaled on the shaft, a rod arranged below the fingers, segmental brackets depending from the fingers, the brackets of the alternate bars being slotted, and the brackets of the alternate bars being provided with bearings, a fixed rod passing through the bearings and the slots, the bars provided with the slots being of greater length than the other bars, springs engaging the segmental brackets of the long bars, means for adjusting the tension of the springs, and a toothed cylinder journaled above the fingers, the teeth of the cylinders moving between the longer bars.

3. In a root extractor, a riddle comprising a shaft, fingers journaled on the shaft, a rod arranged below the fingers, segmentally slotted brackets depending from the fingers, the rod engaging the slots thereof, means for spacing the bars from each other, springs for retaining the bars in their uppermost position, means for varying the tension of the springs, and a toothed cylinder coöperating with the fingers.

4. In a root extractor, a riddle comprising a plurality of spaced fingers, springs for supporting the fingers, means for varying the tension of the springs, and a toothed cylinder journaled above the fingers the teeth of the cylinder moving between the fingers.

5. In a root extractor, a riddle comprising spaced parallel spring supported fingers, and a toothed cylinder coöperating with the fingers.

BENJAMIN GILBERT PATTERSON.

Witnesses:
JOHN L. EVANS,
J. S. PRICE.